(12) United States Patent
Malstron et al.

(10) Patent No.: US 8,142,221 B2
(45) Date of Patent: Mar. 27, 2012

(54) PLUG ASSEMBLY FOR A CONNECTIVITY MANAGEMENT SYSTEM

(75) Inventors: Charles Randall Malstron, Lebanon, PA (US); Keith James McKechnie, Holly Springs, NC (US); Robert Daniel Hilty, Harrisburg, PA (US); Michael Fredrick Laub, Enola, PA (US); Charles David Fry, New Bloomfield, PA (US); Terry Patrick Bowen, Dillsburg, PA (US); Henry Otto Herrmann, Jr., Elizabethtown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/762,885

(22) Filed: Apr. 19, 2010

(65) Prior Publication Data
US 2011/0256768 A1    Oct. 20, 2011

(51) Int. Cl.
*H01R 3/00*    (2006.01)
(52) U.S. Cl. ...................................... 439/489
(58) Field of Classification Search ............. 439/489, 439/490, 620.01, 540.1, 541.5, 219, 385, 439/488, 79, 83; 340/686.1, 687
See application file for complete search history.

(56) References Cited

U.S. PATENT DOCUMENTS

| | | | |
|---|---|---|---|
| 4,968,929 A | 11/1990 | Hauck et al. | |
| 5,107,532 A | 4/1992 | Hansen et al. | |
| 5,166,970 A | 11/1992 | Ward | |
| 5,394,503 A | 2/1995 | Dietz, Jr. et al. | |
| 5,483,467 A | 1/1996 | Krupka et al. | |
| 5,509,817 A | 4/1996 | Tsuji | |
| 5,726,912 A | 3/1998 | Krall, Jr. et al. | |
| 5,835,006 A * | 11/1998 | Michalak et al. | 340/407.1 |
| 5,854,824 A | 12/1998 | Bengal et al. | |
| 6,222,908 B1 | 4/2001 | Bartolutti et al. | |
| 6,234,830 B1 | 5/2001 | Ensz et al. | |
| 6,285,293 B1 | 9/2001 | German et al. | |
| 6,330,307 B1 | 12/2001 | Bloch et al. | |
| 6,350,148 B1 | 2/2002 | Bartolutti et al. | |
| 6,453,014 B1 | 9/2002 | Jacobson et al. | |
| 6,493,319 B1 | 12/2002 | Kramarczyk et al. | |
| 6,522,737 B1 | 2/2003 | Bartolutti et al. | |
| 6,574,586 B1 | 6/2003 | David et al. | |
| 6,626,697 B1 | 9/2003 | Martin et al. | |
| 6,684,179 B1 | 1/2004 | David | |
| 6,725,177 B2 | 4/2004 | David et al. | |
| 6,784,802 B1 | 8/2004 | Stanescu | |
| 6,837,755 B1 * | 1/2005 | Kitajima et al. | 439/830 |
| 6,868,265 B2 | 3/2005 | Zodnik | |
| 6,942,498 B2 * | 9/2005 | Na | 439/76.1 |
| 6,961,675 B2 | 11/2005 | David | |
| 6,976,867 B2 | 12/2005 | Navarro et al. | |
| 7,153,142 B2 | 12/2006 | Shifris et al. | |
| 7,160,143 B2 | 1/2007 | David et al. | |
| 7,193,422 B2 | 3/2007 | Velleca et al. | |

(Continued)

FOREIGN PATENT DOCUMENTS

EP    1 561 122 B1    8/2005

(Continued)

*Primary Examiner* — Tulsidas C Patel
*Assistant Examiner* — Harshad Patel

(57) ABSTRACT

A plug assembly includes a body extending between a mating end and a cable end. A sensor assembly is supported by the body that has an integrated circuit component having a first pad and a second pad. The sensor assembly also has a first sensor probe mounted to the first pad and a second sensor probe mounted to the second pad.

21 Claims, 8 Drawing Sheets

U.S. PATENT DOCUMENTS

| | | |
|---|---|---|
| 7,207,846 B2 | 4/2007 | Caveney et al. |
| 7,258,493 B2 | 8/2007 | Milette |
| 7,297,018 B2 | 11/2007 | Caveney et al. |
| 7,312,715 B2 | 12/2007 | Shalts et al. |
| 7,315,224 B2 | 1/2008 | Gurovich et al. |
| 7,370,106 B2 | 5/2008 | Caveney |
| 7,376,734 B2 | 5/2008 | Caveney |
| 7,563,102 B2 * | 7/2009 | Nordin et al. .................. 439/49 |
| 2002/0090858 A1 * | 7/2002 | Caveney ....................... 439/490 |
| 2006/0148279 A1 | 7/2006 | German et al. |
| 2008/0122579 A1 | 5/2008 | German et al. |
| 2010/0055971 A1 | 3/2010 | Craig et al. |

FOREIGN PATENT DOCUMENTS

| | | |
|---|---|---|
| EP | 1 758 028 A1 | 2/2007 |

* cited by examiner

PLUG ASSEMBLY FOR A CONNECTIVITY MANAGEMENT SYSTEM

CROSS REFERENCE TO RELATED APPLIDCATIONS

This application relates to U.S. application Ser. No. 12/762,813, filed Apr. 19, 2010 and entitled "CONNECTIVITY SENSING ASSEMBLY".

BACKGROUND OF THE INVENTION

The subject matter herein relates generally to connectivity management systems, and more particularly, to a plug assembly for a connectivity management system.

In order to better operate large electrical networks, connectivity management systems have been developed to monitor connections between components within the network. Multi-port receptacle assemblies containing a plurality of receptacles or modular jacks are known and in use in such networks, such as part of a patch panels, switches or other network components.

Within connectivity management systems, the receptacle assemblies typically include a sensor arranged along a mating face of the receptacle assembly. The sensor is positioned to interface with a sensor probe of a plug of a patch cord or other cable connector when mated with the receptacle jack. Connectivity data is transmitted by the probe to the sensor, and the sensor transmits the connectivity data to an analyzer. The analyzer is able to determine which modular plug is connected to which modular jack and accordingly, where each patch cord or cable is routed within the network system.

In known systems, the patch cords and corresponding modular plugs incorporate technology that allows data to be transmitted between both ends of the cord, such as with the addition of an additional wire, sometimes referred to as a $9^{th}$ wire, that is added to the cord. The sensor probes are coupled to the ends of the additional wire. However, such patch cords or cables are expensive to manufacture.

Other known systems do not utilize the $9^{th}$ wire, but instead include circuit boards that are coupled to the plug and that have the sensor probes electrically connected to the circuit boards. The circuit boards have integrated circuit (IC) chips mounted to the circuit boards that store information about the plug and cable that may be used by the connectivity management system to identify the particular cable. However, such plugs incorporating circuit boards that have IC chips are not without disadvantages. For example, the multi-port receptacle assemblies have receptacles that are tightly spaced. As a result, the plugs must also be tightly spaced. The circuit boards tend to be bulky and difficult to position on the plug to allow for tight spacing of multiple plugs. As such, the circuit boards need to be very small and space for embedding the circuitry and IC chips is very limited.

A need remains for a connectivity management system that may be used without cords having extra wires dedicated to connectivity management. A need remains for plugs that incorporate electronics forming part of a connectivity management system, which do not negatively impact the overall size of the plug.

BRIEF DESCRIPTION OF THE INVENTION

In one embodiment, a plug is provided that includes a body extending between a mating end and a cable end. A sensor assembly is supported by the body that has an integrated circuit component having a first pad and a second pad. The sensor assembly also has a first sensor probe mounted to the first pad and a second sensor probe mounted to the second pad.

Optionally, the first and second sensor probes may be mounted to the first and second pads such that the first and second sensor probes extend along parallel axes. The plug may be configured to be received in a receptacle of a receptacle housing through a front connectivity interface thereof, where the receptacle housing having a plurality of connectivity sensors external of the receptacle exposed along the front connectivity interface. The first and second sensor probes may have probe tips that are configured to engage the connectivity sensors at the front connectivity interface when the body of the plug is loaded into the receptacle. Optionally, the second sensor probe may be electrically grounded when mated with a corresponding connectivity sensor associated with a receptacle that receives the plug. The integrated circuit component may include embedded circuitry containing data that uniquely identifies the plug.

Optionally, the sensor assembly may be overmolded into a strain relief boot surrounding a portion of the body, and portions of the first and second sensor probes may extend from the strain relief boot at the mating end of the body. The integrated circuit component may include a substrate and embedded circuitry including a memory, where the circuitry is electrically connected to the first and second pads. The substrate may have a mating surface and a mounting surface opposite to the mating surface, where the mounting surface is mounted to an exterior surface of the body, and where the first and second pads are exposed on, and are substantially flush with, the mating surface. The integrated circuit component may constitute a memory chip having a memory circuit including data that uniquely identifies the plug, where the memory circuit is configured to transmit data when the first and second sensor probes are connected to corresponding connectivity sensors associated with a receptacle that receives the plug. The memory circuit may be configured to transmit data based on an interrogation signal transmitted to at least one of the first and second sensor probes.

In another embodiment, a plug is provided that includes a body extending between a mating end and a cable end. A sensor assembly is supported by the body that has an integrated circuit component having a first pad and a second pad. The sensor assembly also has a first clip mounted to the first pad and a second clip mounted to the second pad. A first sensor probe is mounted to the first clip and a second sensor probe is mounted to the second clip. The first clip creates a direct electrical path between the first pad and the first sensor probe and the second clip creates a direct electrical path between the second pad and the second sensor probe.

Optionally, the first and second sensor probes are held by the first and second clips in an interference fit. The first clip may include a first spring beam extending therefrom being electrically and mechanically coupled to the first pad, and the second clip may include a second spring beam extending therefrom being electrically and mechanically coupled to the second pad. The first and second spring beams may allow the first and second clips to move relative to the first and second pads, respectively.

In a further embodiment, a plug is provided that includes a body extending between a mating end and a cable end. A sensor assembly is supported by the body that has an integrated circuit component having a mating surface with a first pad and a second pad. A first sensor probe extends along the mating surface and is electrically and mechanically connected to the first pad. A second sensor probe extends along the mating surface and is electrically and mechanically connected to the second pad.

Optionally, the first and second sensor probes may be directly connected to the first and second pads by a conductive joint. The plug may include a first standoff positioned between the first sensor probe and the first pad and a second standoff positioned between the second sensor probe and the second pad. The first and second standoffs may elevate the first and second sensor probes above the first and second pads. The first and second standoffs may define direct electrical paths between the first and second sensor probes and the first and second pads, respectively.

DETAILED DESCRIPTION OF THE INVENTION

Figure 1:
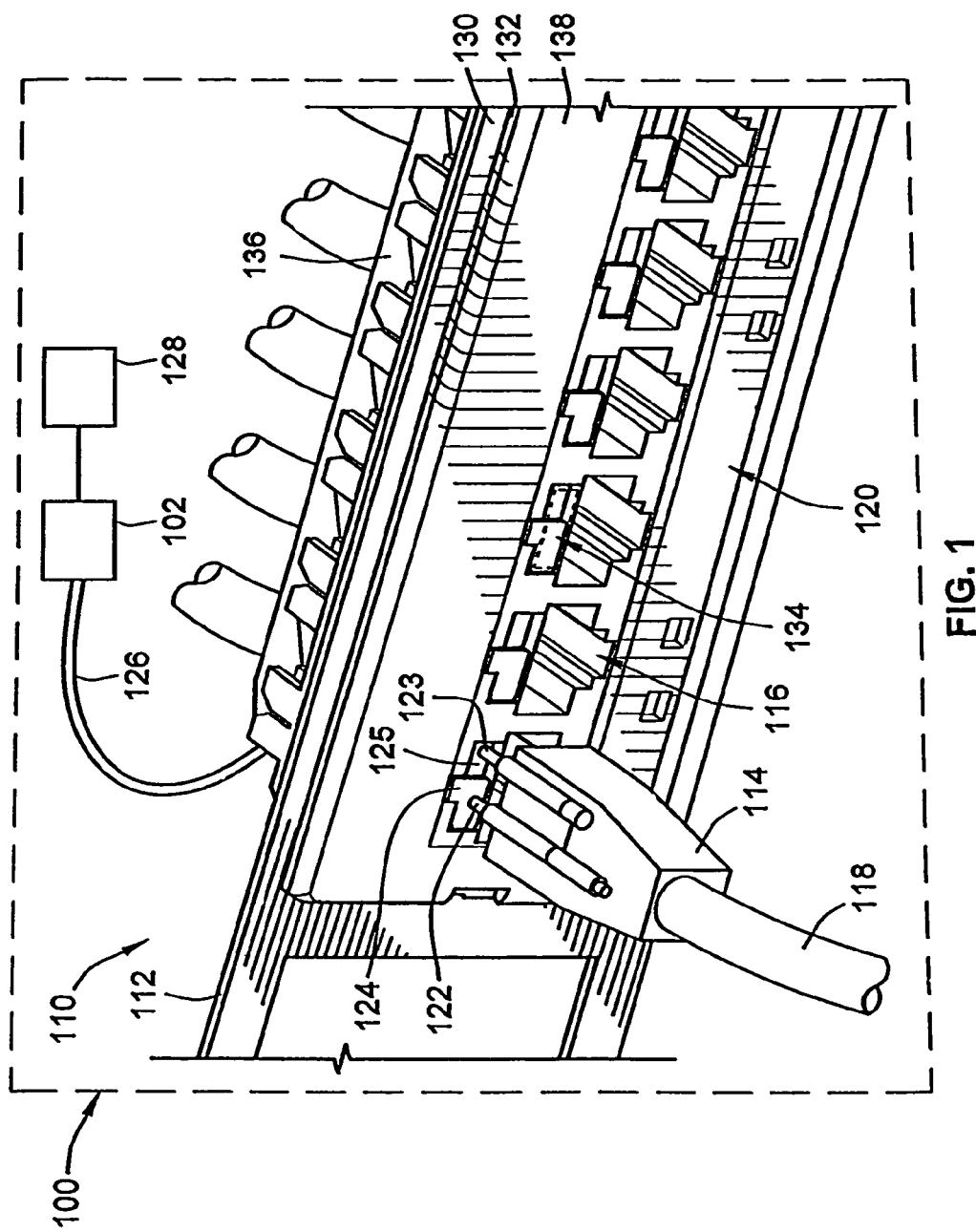
FIG. 1 is a schematic illustration of a connectivity management system showing a receptacle assembly and a modular plug mated with the receptacle assembly.

FIG. 1 is a schematic illustration of a connectivity management system 100 showing a receptacle assembly 120 and a plug assembly 114 mated with the receptacle assembly 120. Any number of plug assemblies 114 may be mated with the receptacle assembly 120, depending on the particular application. The plug assemblies 114 represent smart plugs containing data that uniquely identifies the particular plug. The smart plugs may include active components that communicate information about the plug to the connectivity management system 100.

The connectivity management system 100 includes an analyzer 102 for analyzing the connectivity or status of the various network components of a cable interconnect system 110. The cable interconnect system 110 includes one or more panels 112 and a plurality of the receptacle assemblies 120 mounted to the panels 112. The panels 112 and receptacle assemblies 120 may define patch panels, switches or other network components.

The plug assemblies 114 may be connected to any of the receptacles 116 of the receptacle assemblies 120. The plug assemblies 114 are provided at ends of cables 118, such as patch cords. In an exemplary embodiment, each of the plug assemblies 114 include a pair of sensor probes 122, 123 used to indicate connectivity or plug status, as described in further detail below. The cables 118 may be routed between various ones of the panels 112 or other network components. The plug assemblies 114, with the sensor probes 122, 123, may come from other equipment in the cable interconnect system 110.

The receptacle assemblies 120 include connectivity sensors 124, 125 at a front mating face thereof for interfacing with the sensor probes 122, 123 when the plug assemblies 114 are received in the receptacles 116. The connectivity sensors 124, 125 are used to indicate connectivity or status of the receptacle 116 or plug assembly 114, such as by sensing the presence of the sensor probes 122, 123 and sending signals relating to the presence of the sensor probes 122, 123 to the analyzer 102, such as via connectivity cables 126 that interconnect the receptacle assemblies 120 and the analyzer 102. In an exemplary embodiment, the analyzer 102 periodically, or continuously, sends interrogation signals to the connectivity sensors 124, 125. When one of the plug assemblies 114 is loaded within a corresponding receptacle 116, the sensor probes 122, 123 interface with the connectivity sensors 124, 125. The interrogation signals are transferred across the interface to the sensor probes 122, 123 to the plug assembly 114. Data unique to the particular plug assembly 114 is stored within the plug assembly 114 and is then transferred across the interface between the sensor probes 122, 123 and the connectivity sensors 124, 125 back to the analyzer 102. For example, data that uniquely identifies the plug assembly 114 may be transferred to the analyzer and/or other data about the plug assembly 114 may be transferred to the analyzer 102.

The analyzer 102 determines the connectivity of the cables within the cable interconnect system 110, such as which plug assembly 114 is connected to which receptacle 116 and/or where each patch cord or cable 118 is routed within the cable interconnect system 110, or particular information about the plug assembly 114. Optionally, the analyzer 102 may be mounted to a rack or other support structure of the cable interconnect system 110. Alternatively, the analyzer 102 may be positioned remote from the rack and the network panels 112. Data relating to the connectivity or interconnection of the patch cords or cables 118 is transmitted to the analyzer 102 by the connectivity cables 126.

In an exemplary embodiment, the analyzer 102 is interconnected with a computing device 128 by an Ethernet connection or another connection, such as a direct connection by a cable connector. The connectivity data is gathered by connectivity sensors 124, 125 when a particular plug assembly 114 is mated with a particular receptacle 116. The connectivity data gathered by the analyzer 102 may be transmitted to the computing device 128 and then viewed, stored and/or manipulated by the computing device 128. Alternatively, the analyzer 102 may store and/or manipulate the connectivity data. Optionally, the analyzer 102 and the computing device 128 may be one device. Optionally, multiple analyzers 102 may be connected to the computing device 128.

The receptacle assembly 120 includes a housing 130 having a front mating face 132. The housing 130 includes a plurality of the receptacles 116 that are configured to receive the plug assemblies 114. The connectivity sensors 124, 125 are arranged in connectivity sensor areas 134. Each receptacle 116 has a corresponding connectivity sensor area 134 for sensing the connectivity status of that particular receptacle 116. For example, when the plug assembly 114 is loaded into the receptacle 116, the sensor probes 122, 123 engage the connectivity sensors 124, 125 and create a sense circuit. The analyzer 102 analyzes the sense circuit to determine the connectivity status. For example, particular information about the plug assembly 114 (e.g. information that uniquely identifies the plug assembly 114, such as by serial number or by another unique identifier) may be conveyed by the sensor probes 122, 123 to the connectivity sensors 124, 125, and such information may then be conveyed to the analyzer 102. As such, the sense circuit defines a plug identification circuit. The plug assemblies 114 may define smart plugs having embedded circuitry and/or memory containing information that uniquely identifies the plug assembly 114. Such information is capable of being conveyed to the connectivity sensors 124, 125 by the sensor probes 122, 123. When both plug assemblies 114 at either ends of the cable 118 are identified as belonging to the same patch cord, or otherwise being connected together by the particular cable 118, the analyzer 102 is able to determine which two receptacles 116 are electrically interconnected by the particular cable 118. In the illustrated embodiment, the connectivity sensor areas 134 are positioned vertically above the corresponding receptacle 116, however other locations are possible in alternative embodiments, such as vertically below the receptacle 116.

In an exemplary embodiment, the receptacle assembly 120 includes a plurality of modular jacks 136 that are removably coupled to the housing 130. The modular jacks 136 are cable mounted with an individual cable being associated with, and extending from, a corresponding one of the modular jacks 136. The modular jacks 136 and associated receptacles 116 are accessible through a faceplate 138 at the front mating face 132. The connectivity sensors 124, 125 are also accessible through the faceplate 138. As such, when the plug assemblies 114 are loaded into the receptacles 116, the sensor probes 122, 123 engage the connectivity sensors 124, 125.

In an alternative embodiment, rather than individual modular jacks, the receptacles 116 may be electrically connected to internal electrical components, such as a circuit board and one or more rear electrical connectors coupled to the circuit board. A cable connector may then be mated with the one or more electrical connectors. As such, one or more of the receptacles 116 may be electrically connected to a corresponding cable connector at the rear of the housing 130.

Figure 2:
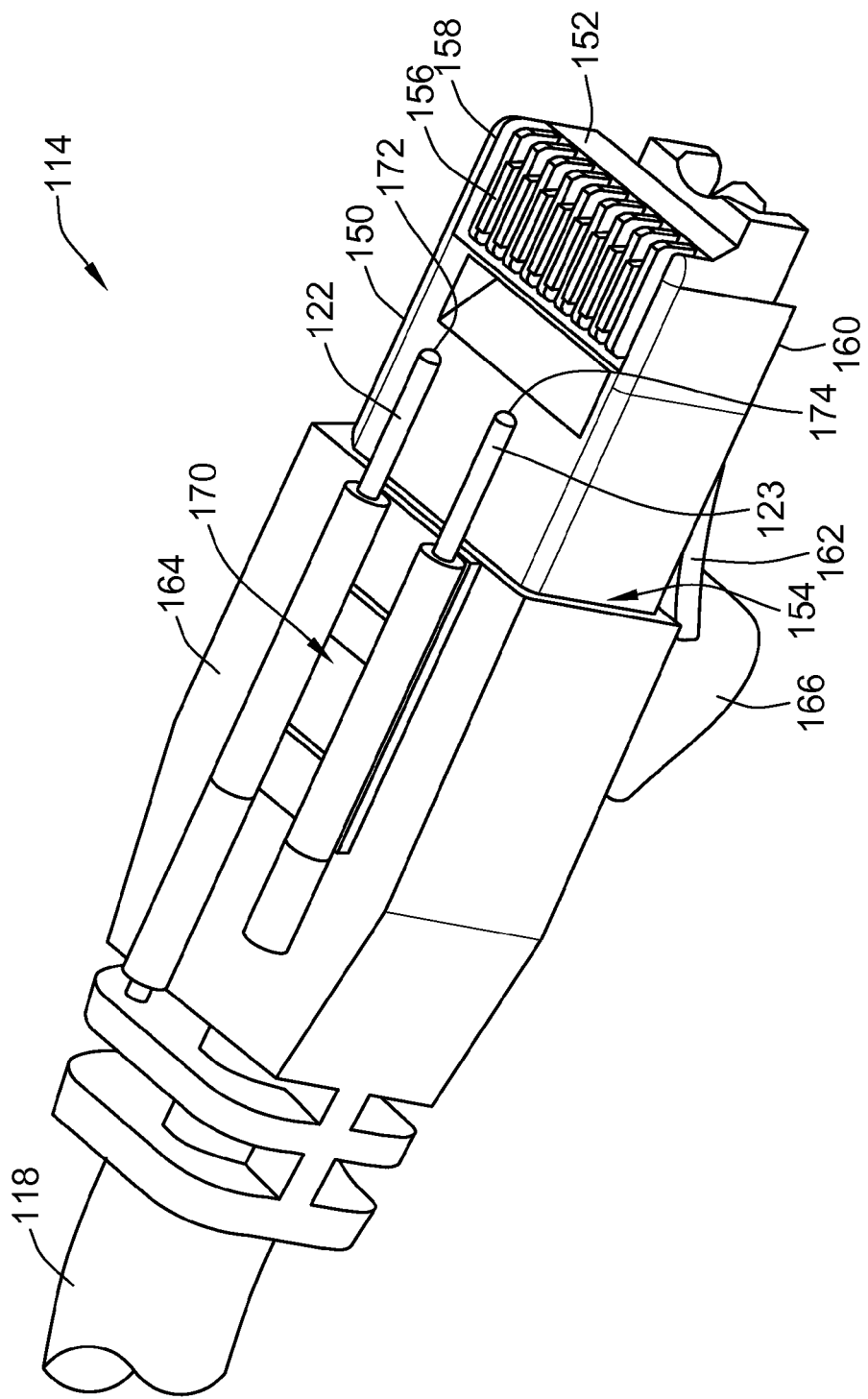
FIG. 2 is a front perspective view of the plug shown in FIG. 1.

FIG. 2 is a front perspective view of the plug assembly 114. The plug assembly 114 is provided at an end of the cable 118. The plug assembly 114 includes a body 150 extending between a mating end 152 and a cable end 154. The body 150 holds a plurality of contacts 156 at the mating end 152. The contacts 156 are configured to mate with corresponding mating contacts (not shown) within the corresponding receptacle 116 (shown in FIG. 1). The body 150 is generally rectangular in cross-section, and includes a first side 158 and a second side 160 opposite the first side 158. A latch 162 extends from the second side 160 of the body 150. The latch 162 is used to hold the plug assembly 114 within the receptacle 116. The contacts 156 are exposed along the first side 158 for mating with the mating contacts of the receptacle 116.

In an exemplary embodiment, the plug assembly 114 includes a strain relief boot 164 covering a portion of the body 150 at the cable end 154. The strain relief boot 164 is coupled to the cable 118 to provide strain relief between the plug assembly 114 and the individual wires of the cable 118. The strain relief boot 164 includes a hood 166 that receives a free end of the latch 162. The hood 166 is compliant and may be compressed to deflect the latch 162. The strain relief boot 164 may either be molded directly onto the cable 118 or may be a discrete slip-on style boot. The strain relief boot 164 is manufactured from a plastic material, such as PVC, and may be manufactured by a molding process.

In an exemplary embodiment, the plug assembly 114 includes a sensor assembly 170 that forms part of the cable interconnect system 110 (shown in FIG. 1). The sensor assembly 170 includes the first and second sensor probes 122, 123. The sensor assembly 170 is supported by the body 150. In an exemplary embodiment, the sensor assembly 170 is over-molded with the strain relief boot 164 during the molding process and then attached to, and held by, the body 150 when the plug assembly 114 and cable 118 are assembled. Alternatively, the sensor assembly 170 may be loaded into the strain relief boot 164 and attached to the body 150 or attached to the body and then the strain relief boot 164 being mounted to the body 150 over the sensor assembly 170. The sensor probes 122, 123 extend beyond the strain relief boot 164 and are exposed for mating with the connectivity sensors 124, 125 (shown in FIG. 1). The sensor probes 122, 123 are elevated above the first side 158 and are spaced apart from one another. Optionally, the sensor probes 122, 123 may extend along parallel axes. In an exemplary embodiment, the sensor probes 122, 123 include probe tips 172, 174 that engage the connectivity sensors 124, 125. Optionally, the sensor probes 122, 123 may constitute spring loaded pins and may be compressed when the probe tips 172, 174 engage the connectivity sensors 124, 125.

Figure 3:
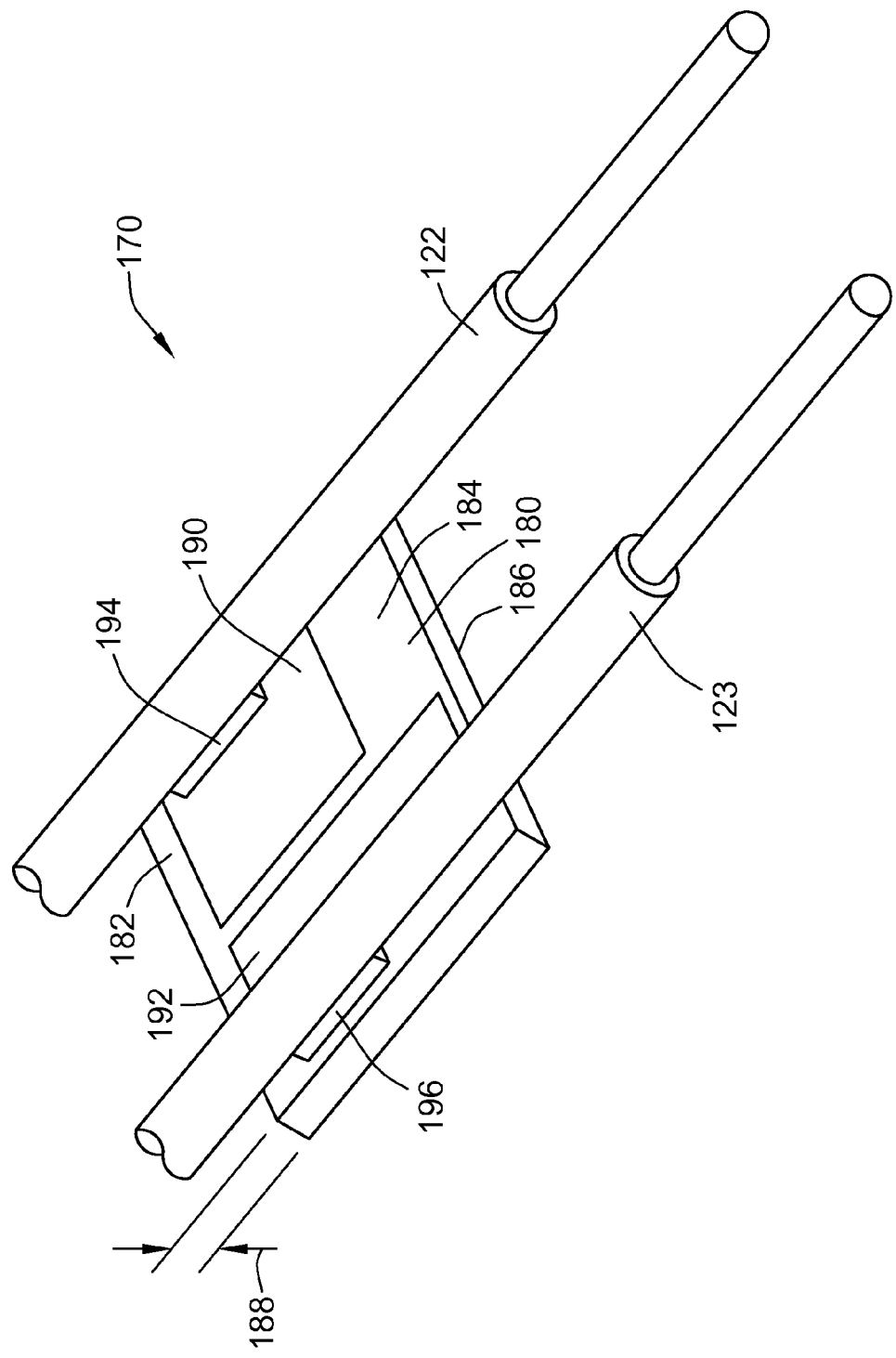
FIG. 3 illustrates sensor probes attached to an integrated circuit component of the plug in accordance with an exemplary embodiment.

FIG. 3 illustrates the sensor assembly 170 including the sensor probes 122, 123 and an integrated circuit component 180. The sensor probes 122, 123 are directly connected to the integrated circuit component 180. As such, the sensor probes 122, 123 are electrically and mechanically coupled to the integrated circuit component 180. In an exemplary embodiment, the integrated circuit component 180 has integral memory logic containing data that uniquely identifies the integrated circuit component 180 and thus uniquely identifies the plug assembly 114 (shown in FIG. 2). The integral memory logic communicates with the analyzer 102 (shown in FIG. 1) via the sensor probes 122 and/or 123.

The integrated circuit component 180 may be a passive component or an active component. The integrated circuit component 180 may include resistors, capacitors, inductors, circuit protection devices, fuses, transducers, sensors, and the like. The integrated circuit component 180 may include sensors such as environmental sensors (e.g. thermal, humidity, magnetic field, and the like), positional sensors (e.g. Hall Effect, Permanent magnetic Linear Contactless Displacement (PLCD), motion, and the like), force sensors, and the like. The integrated circuit component 180 may include an indicator and/or a power source or may be operatively coupled to an indicator or power source. The integrated circuit component 180 may include memory that stores information such as identification data, historical data such as which receptacles has the plug been mated to in the past, how many times has the plug been changed, different protocols, characteristics about the cable, such as the type of cable, and the like.

The integrated circuit component 180 includes a substrate 182 having a mating surface 184 and a mounting surface 186 opposite the mating surface 184. The substrate 182 has a thickness 188 measured between the mating and mounting surfaces 184, 186. The thickness 188 may be substantially less than the length or width of either the mating surface 184 or the mounting surface 186. As such, the substrate 182 has a low profile. Optionally, the substrate 182 may represent a flexible film having a minimal thickness 188. Alternatively, the substrate 182 may be a rigid structure having one or more layers. The substrate 182 may include semiconductors forming part of the memory logic circuitry. The mounting surface 186 generally faces an exterior surface of the body 150 (shown in FIG. 2) of the plug assembly 114 (shown in FIG. 2). Optionally, the mounting surface 186 may engage and/or be mounted to the exterior surface of the body 150. The sensor probes 122, 123 are mated to the mating surface 184 of the substrate 182.

In an exemplary embodiment, the integrated circuit component 180 includes a first pad 190 and a second pad 192 at the mating surface 184. The first sensor probe 122 is mounted to the first pad 190. The second sensor probe 123 is mounted to the second pad 192. Mounting features are used to electrically and mechanically attach the sensor probes 122, 123 to the corresponding pads 190, 192 of the integrated circuit component 180. For example, in the illustrated embodiment, the mounting features are represented by a first standoff 194 positioned between the first sensor probe 122 and the first pad 190 and a second standoff 196 positioned between the second sensor probe 123 and the second pad 192. The standoffs 194, 196 are electrically conductive. The sensor probes 122, 123 are electrically and mechanically secured to the standoffs 194, 196 at a conductive joint, the conductive joint being a soldered connection, a conductive adhesive, a conductive epoxy, and the like. Optionally, the standoffs 194, 196 may have a curved surface that generally matches the radius of curvature of the sensor probes 122, 123. The standoffs 194, 196 are electrically and mechanically secured to the first and second pads 190, 192 at a conductive joint, the conductive joint being a soldered connection, a conductive adhesive, a conductive epoxy, and the like. The standoffs 194, 196 elevate the sensor probes 122, 123 off of the mating surface 184, where the height of the standoffs 194, 196 controls the amount of elevation. The sensor probes 122, 123 are electrically and mechanically secured to the first and second pads 190, 192 without the need for a separate circuit board, such as a circuit board that supports the integrated circuit component 180 having the sensor probes 122, 123 then connected to such circuit board. As such, the overall size and footprint of the sensor assembly 170 may be smaller than when using a separate circuit board.

In an alternative embodiment, the sensor probes 122, 123 may be mounted to the first and second pads 190, 192 without the use of the standoffs 194, 196. For example, the sensor probes 122, 123 may directly engage, and be coupled to the first and second pads 190, 192 at a conductive joint, the conductive joint being a soldered connection, a conductive adhesive, a conductive epoxy, and the like.

Figure 4:
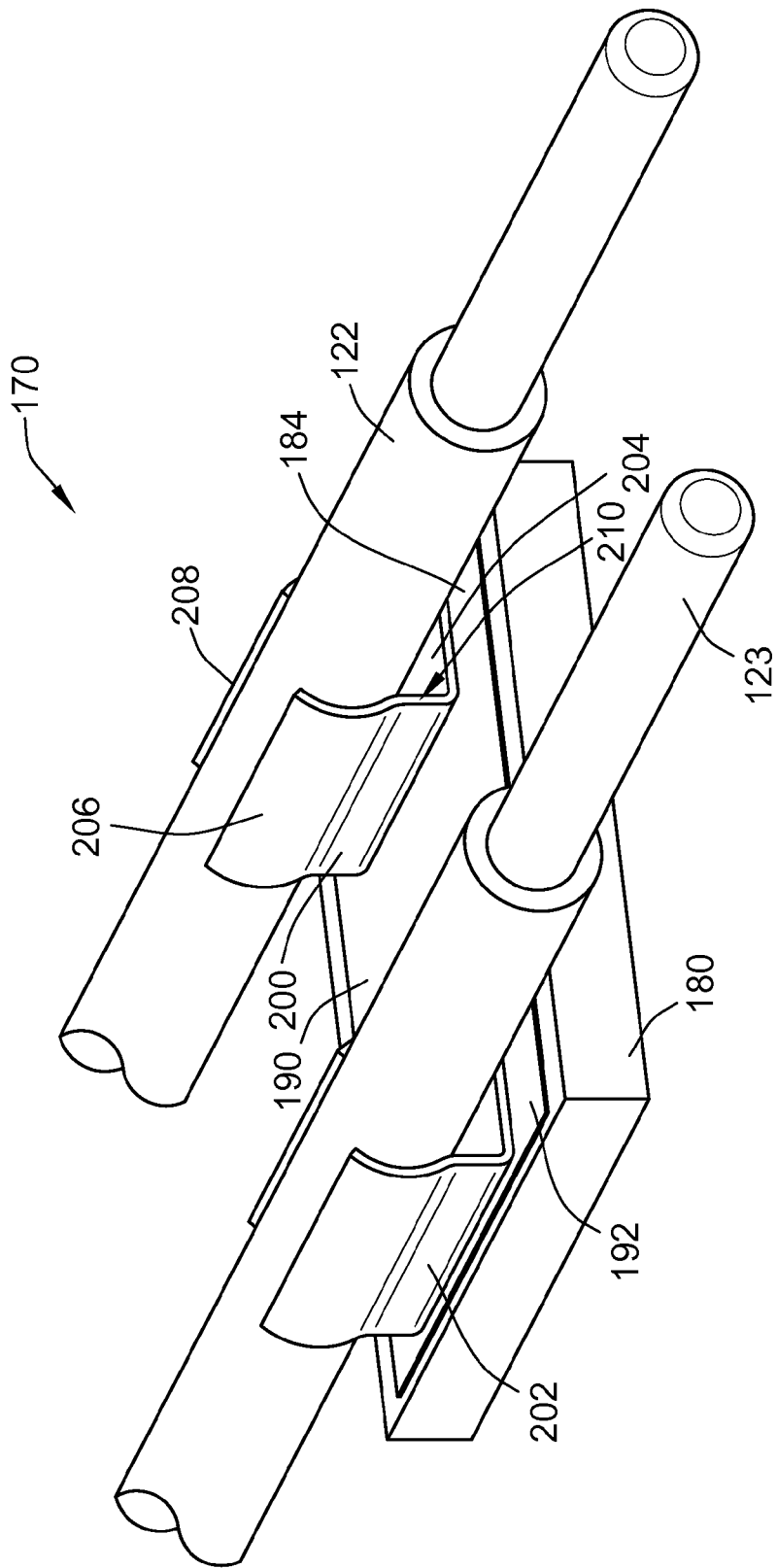
FIG. 4 illustrates sensor probes attached to an integrated circuit component of the plug in accordance with an alternative embodiment.

FIG. 4 illustrates the sensor probes 122, 123 attached to the integrated circuit component 180 in accordance with an alternative embodiment. In the embodiment illustrated in FIG. 4, the sensor assembly 170 utilizes mounting features represented by clips 200, 202 to interconnect the sensor probes 122, 123 with the first and second pads 190, 192. The clips 200, 202 are electrically conductive and create a conductive path between the sensor probes 122, 123 and the first and second pads 190, 192. The clips 200, 202 are mounted to the first and second pads 190, 192 to mechanically and electrically connect the sensor probes 122, 123 to the first and second pads 190, 192.

The clips 200, 202 are substantially identical to one another. The clip 200 includes a base 204 and opposed arms 206, 208 that extend away from the base 204. The base 204 is mechanically and electrically connected to the first pad 190 at a conductive joint, the conductive joint being a soldered connection, a conductive adhesive, a conductive epoxy, and the like. The arms 206, 208 snap onto the first sensor probe 122 and hold the first sensor probe 122 by an interference fit. Alternatively, the arms 206, 208 may be secured to the sensor probe 122 by other means, such as by a soldered connection, using a conductive adhesive, a conductive epoxy, and the like. The arms 206, 208 are curved to fit around the sensor probe 122, however the arms 206, 208 may have any other shape that generally complements the shape of the sensor probe 122 to insure good electrical contact between the clip 200 and the sensor probe 122.

In an exemplary embodiment, the arms 206, 208 each have a standoff portion 210 extending from the base 204. The standoff portions 210 function to elevate the sensor probe 122 at a particular height above the mating surface 184 of the integrated circuit component 180. The standoff portions 210 may have any height depending on the particular application. The height may be selected to align the sensor probes 122, 123 with the corresponding connectivity sensors 124, 125 (shown in FIG. 1).

The sensor probe 122 may include a circumferential channel (not shown), wherein the clip 200 is received within the channel to axially position the sensor probe 122 with respect to the clip 200. Axial movement of the sensor probe 122 with respect to the clip 200 may be restricted by the channel.

Figure 5:
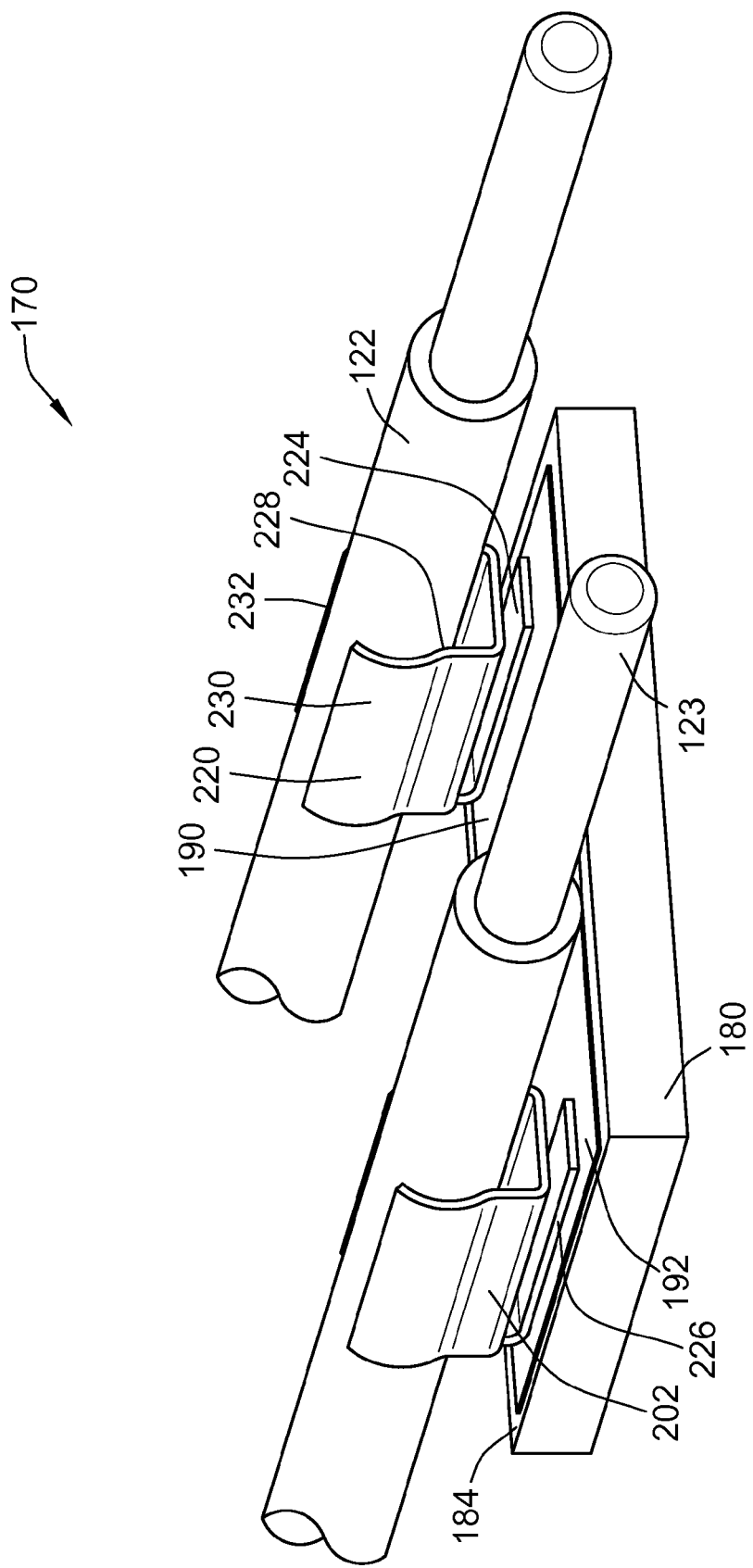
FIG. 5 illustrates sensor probes attached to an integrated circuit component of the plug in accordance with another alternative embodiment.

FIG. 5 illustrates the sensor probes 122, 123 attached to the integrated circuit component 180 in accordance with an alternative embodiment. In the embodiment illustrated in FIG. 5, the sensor assembly 170 utilizes mounting features represented by clips 220, 222 to interconnect the sensor probes 122, 123 with the first and second pads 190, 192. The clips 220, 222 are electrically conductive and create a conductive path between the sensor probes 122, 123 and the first and second pads 190, 192. The clips 220, 222 are similar to the clips 200, 202 illustrated in FIG. 4, however the clips 220, 222 include spring beams 224, 226 extending therefrom. The spring beams 224, 226 allow the clips 220, 222 to move relative to the first and second pads 190, 192.

The clips 220, 222 are substantially identical to one another. The clip 220 includes a base 228 and opposed arms 230, 232 that operate in a similar manner as the arms 206, 208 (shown in FIG. 4). The arms 230, 232 extend away from the base 228 in an opposite direction from the spring beam 224. The spring beam 224 is wrapped around underneath the base 228 and may extend substantially the entire length of the base 228. The spring beam 224 is mechanically and electrically connected to the first pad 190, so that the spring beam 224 does not move relative to the first pad 190. The base 228, and thus the sensor probe 122 is able to move in one or more directions relative to the first pad 190 when the spring beam 224 is flexed. In operation, when the sensor probe 122 engages the connectivity sensor 124 (shown in FIG. 1) and/or when the sensor probe 122 is accidentally touched such as during handling of the plug assembly 114, the spring beam 224 allows the sensor probe 122 to move which reduces stress at the interface between the clip 220 and the first pad 190.

Figure 6:
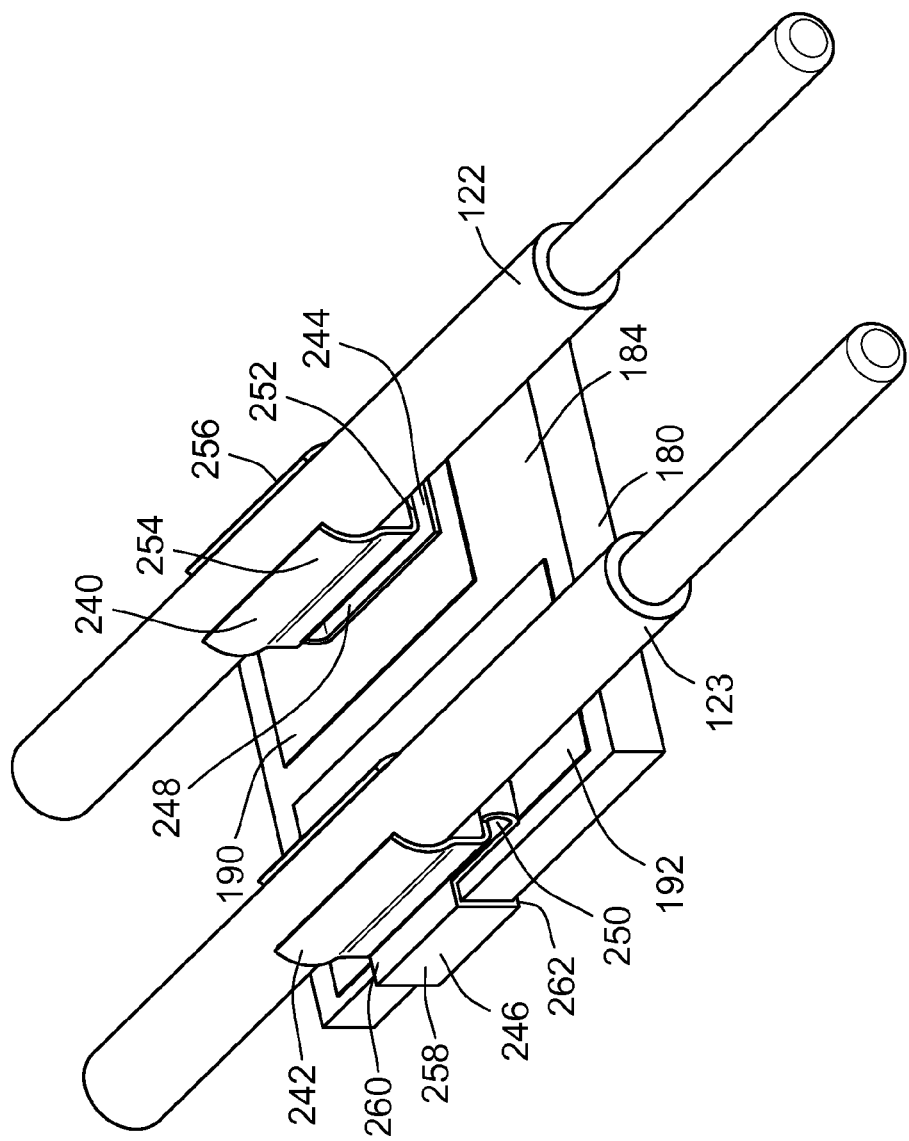
FIG. 6 illustrates sensor probes attached to an integrated circuit component of the plug in accordance with you another alternative embodiment.

FIG. 6 illustrates the sensor probes 122, 123 attached to the integrated circuit component 180 in accordance with an alternative embodiment. In the embodiment illustrated in FIG. 6, the sensor assembly 170 utilizes mounting features represented by clips 240, 242 to interconnect the sensor probes 122, 123 with the first and second pads 190, 192. The clips 240, 242 are electrically conductive and create a conductive path between the sensor probes 122, 123 and the first and second pads 190, 192. The clips 240, 242 are similar to the clips 220, 222 illustrated in FIG. 5, however the clips 240, 242 include mounting clips 244, 246 extending from spring beams 248, 250. The spring beams 248, 250 are similar to the spring beams 224, 226 (shown in FIG. 5) and allow the clips 240, 242 to move relative to the first and second pads 190, 192.

The clips 240, 242 are substantially identical to one another. The clip 240 includes a base 252 and opposed arms 254, 256 that operate in a similar manner as the arms 206, 208 (shown in FIG. 4). The spring beam 248 extends from the base 252 and the mounting clip 244 extends from a portion of the spring beam 248. The mounting clip 244, along with the associated spring beam 248, has a C-shape with a back 258, and opposed legs 260, 262. The legs 260, 262 clamp onto the substrate 182 with the leg 260 associated with the spring beam 248 engaging the mating surface 184 and with the leg 262 engaging the mounting surface 186. The mounting clip 244 may be used to secure the clip 240 to the integrated circuit component 180 without the use of solder, adhesives or other fasteners. When the leg 260 and/or spring beam 248 engage the first pad 190, an electrical connection is established.

Figure 7:
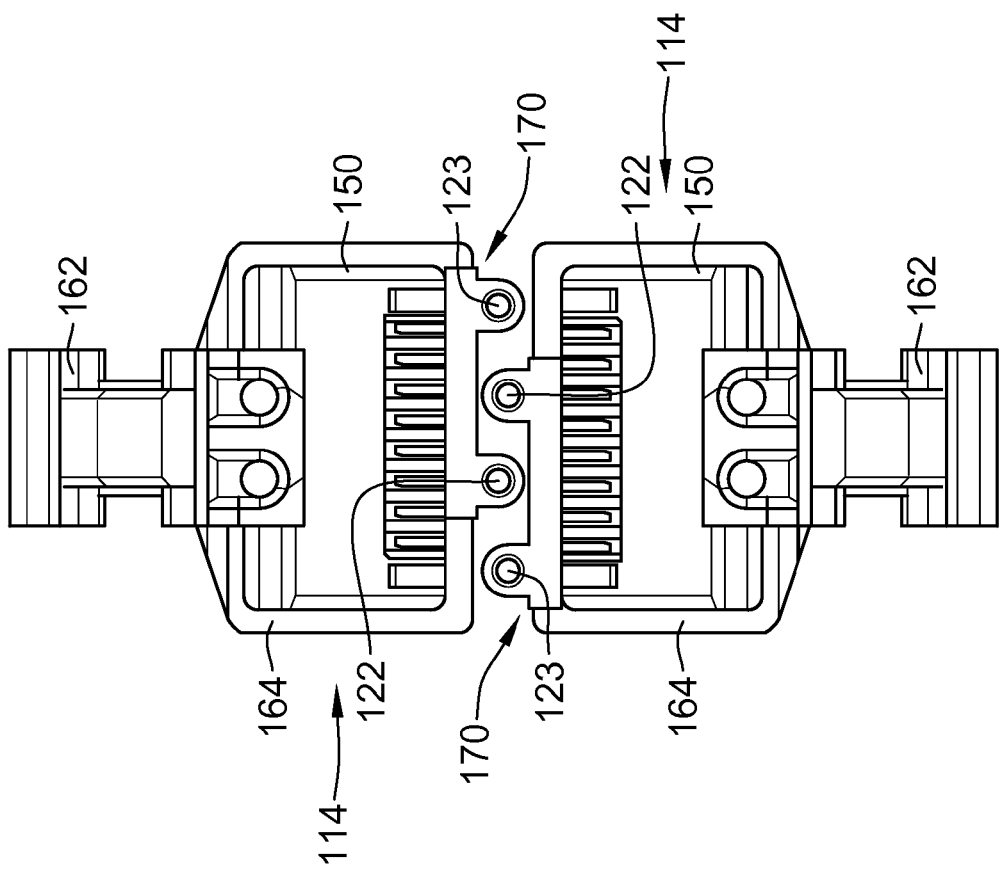
FIG. 7 is a front view of a pair of the plug assembly shown in FIG. 1 stacked together.

FIG. 7 is a front view of a pair of the plug assemblies 114 stacked together. In an exemplary embodiment, the sensor assembly 170 is offset with respect the body 150 such that the sensor assembly 170 is positioned closer to one of the sides of the body 150. When the plug assemblies 114 are stacked together, the sensor assemblies 170 are positioned on the inside and face one another and the latches 162 are positioned on the outside and face away from one another. Because the sensor assemblies 170 are offset, the sensor probes 122, 123 of the upper plug assembly 114 are interdigitated with the sensor probes 122, 123 of the lower plug assembly 114. As a result, the upper and lower plug assemblies 114 may be tightly stacked. The connectivity sensors 124, 125 (shown in FIG. 1) are positioned for mating with the corresponding sensor probes 122, 123.

The sensor assemblies 170 are overmolded and formed as integral parts of the strain relief boots 164. Optionally, the sensor assemblies 170 may be overmolded simultaneously with the strain relief boots 164. Alternatively, the sensor assemblies 170 may be overmolded during an initial stage, and then either coupled to, or molded with, the strain relief boots 164.

Figure 8:
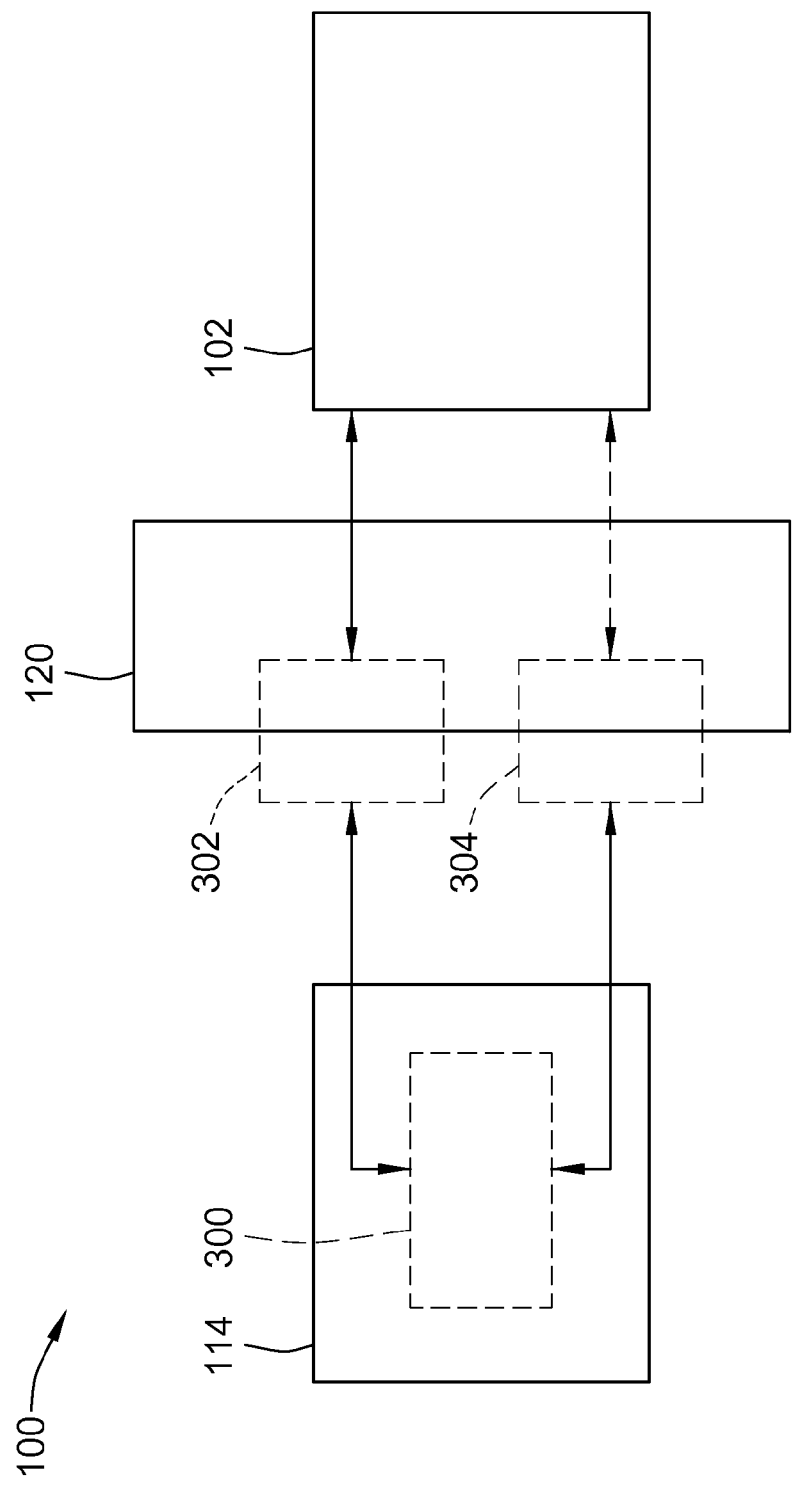
FIG. 8 is a schematic illustration of the connectivity management system shown in FIG. 1.

FIG. 8 is a schematic illustration of the connectivity management system 100, illustrating the analyzer 102, the receptacle assembly 120, and the plug assembly 114. In an exemplary embodiment, the plug assembly 114 includes a memory logic circuit 300 integral to the plug assembly 114. The memory logic circuit 300 is capable of uniquely identifying the particular plug assembly 114. In alternative embodiments, in addition to, or alternatively, the plug assembly 114 may include one or more different types of circuits to accomplish different functions and to communicate different data to the analyzer 102. The receptacle assembly 120 includes a first sense circuit 302 and may include a second sense circuit 304. In lieu of the second sense circuit 304, the receptacle assembly 120 may include a ground circuit that is electrically grounded or a power circuit that powers components on the plug assembly 114.

In operation, the analyzer 102 communicates with the first sense circuit 302 and/or the second sense circuit 304. The analyzer 102 is able to send and/or receive signals from the corresponding sense circuits 302, 304. The first sense circuit 302 communicates with the memory logic circuit 300. For example, the first sense circuit 302 may communicate with the memory logic circuit 300 via the first sensor probe 122 (shown in FIG. 1). The second sense circuit 304 communicates with the memory logic circuit 300. For example, the second sense circuit 304 may communicate with the memory logic circuit 300 via the second sensor probe 123 (shown in FIG. 1). In an exemplary embodiment, an interrogation signal may be periodically, or continuously, sent from the analyzer 102 to the memory logic circuit 300 and either the first and/or second sense circuits 302, 304. Connectivity data, such as data that uniquely identifies the particular plug assembly 114, may then be transmitted back to the analyzer 102 after the interrogation signal is received.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A plug assembly comprising:
a plug body extending between a mating end and a cable end, the mating end being configured to be received in a receptacle of a receptacle housing; and
a sensor assembly supported by the body, the sensor assembly having an integrated circuit component having a first pad and a second pad, the sensor assembly having a first sensor probe mounted to the first pad, the sensor assembly having a second sensor probe mounted to the second pad, the first and second sensor probes forming part of a plug identification circuit defined by the integrated circuit component when the first and second sensor probes are connected to corresponding connectivity sensors associated with the receptacle that receives the mating end of the plug body.

2. The plug assembly of claim 1, wherein the first and second sensor probes are directly connected to the first and second pads by a conductive joint.

3. The plug assembly of claim 1, further comprising mounting features comprising a first standoff and a second standoff, the mounting features directly connect the first and second sensor probes to the first and second pads, respectively, wherein the first standoff positioned between the first sensor probe and the first pad and the second standoff positioned between the second sensor probe and the second pad, the first and second standoffs elevate the first and second sensor probes above the first and second pads, the first and second standoffs defining direct electrical paths between the first and second sensor probes and the first and second pads, respectively.

4. The plug assembly of claim 1, further comprising mounting features comprising first and second clips, the mounting features directly connect the first and second sensor probes to the first and second pads, respectively, wherein the first sensor probe is held by the first clip in an interference fit, and the second sensor probe is held by the second clip in an interference fit, the first clip being electrically and mechanically coupled to the first pad, the second clip being electrically and mechanically coupled to the second pad.

5. The plug assembly of claim 1, further comprising mounting features comprising first and second clips, the mounting features directly connect the first and second sensor probes to the first and second pads, respectively, wherein, the first clip has a first spring beam extending therefrom being electrically and mechanically coupled to the first pad, and the second clip has a second spring beam extending therefrom being electrically and mechanically coupled to the second pad, the first and second spring beams allowing the first and second clips to move relative to the first and second pads, respectively.

6. The plug assembly of claim 1, wherein the first and second sensor probes are mounted to the first and second pads such that the first and second sensor probes extend along parallel axes.

7. The plug assembly of claim 1, wherein the plug body is configured to be received in a receptacle of a receptacle housing through a front connectivity interface thereof, the receptacle housing having a plurality of connectivity sensors external of the receptacle exposed along the front connectivity interface, and wherein the first and second sensor probes have probe tips being configured to engage the connectivity sensors at the front connectivity interface when the body of the plug is loaded into the receptacle.

8. The plug assembly of claim 1, wherein the second sensor probe is electrically grounded when mated with a corresponding connectivity sensor associated with a receptacle that receives the plug.

9. The plug assembly of claim 1, wherein the integrated circuit component includes embedded circuitry containing data that uniquely identifies the plug.

10. The plug assembly of claim 1, wherein the sensor assembly is overmolded into a strain relief boot surrounding a portion of the body, portions of the first and second sensor probes extending from the strain relief boot at the mating end of the body.

11. The plug assembly of claim 1, wherein the integrated circuit component includes a substrate and embedded circuitry including a memory, the circuitry being electrically connected to the first and second pads, the substrate having a mating surface and a mounting surface opposite to the mating surface, the mounting surface being mounted to an exterior surface of the body, the first and second pads being exposed on, and being substantially flush with, the mating surface.

12. A plug assembly comprising:
a body extending between a mating end and a cable end; and
a sensor assembly supported by the body, the sensor assembly having an integrated circuit component having a first pad and a second pad, the sensor assembly having a first sensor probe mounted to the first pad, the sensor assembly having a second sensor probe mounted to the second pad, wherein the integrated circuit component comprises a memory chip having a memory circuit including data that uniquely identifies the plug, the memory circuit being configured to transmit data when the first and second sensor probes are connected to corresponding connectivity sensors associated with a receptacle that receives the body, the memory circuit being configured to transmit data based on an interrogation signal transmitted to at least one of the first and second sensor probes.

13. The plug assembly of claim 12, wherein the body is configured to be received in a receptacle of a receptacle housing through a front connectivity interface thereof, the receptacle housing having a plurality of connectivity sensors external of the receptacle exposed along the front connectivity interface, and wherein the first and second sensor probes have probe tips being configured to engage the connectivity sensors at the front connectivity interface when the body of the plug is loaded into the receptacle.

14. The plug assembly of claim 12, wherein the integrated circuit component includes a substrate and embedded circuitry including a memory, the circuitry being electrically connected to the first and second pads, the substrate having a mating surface and a mounting surface opposite to the mating surface, the mounting surface being mounted to an exterior surface of the body, the first and second pads being exposed on, and being substantially flush with, the mating surface.

15. A plug comprising:
a body extending between a mating end and a cable end; and
a sensor assembly supported by the body, the sensor assembly having an integrated circuit component having a substrate and embedded circuitry including a memory, the substrate having a mounting surface and a mating surface with a first pad and a second pad, the circuitry being electrically connected to the first and second pads, the mounting surface being mounted to an exterior surface of the body, the first and second pads being exposed on, and being substantially flush with, the mating surface, the sensor assembly having a first sensor probe extending along the mating surface and being electrically and mechanically connected to the first pad, the sensor assembly having a second sensor probe extending along the mating surface and being electrically and mechanically connected to the second pad.

16. The plug of claim 15, wherein the first and second sensor probes are directly connected to the first and second pads by a conductive joint.

17. The plug of claim 15, further comprising mounting features comprising a first standoff positioned between the first sensor probe and the first pad and a second standoff positioned between the second sensor probe and the second pad, the first and second standoffs elevate the first and second sensor probes above the first and second pads, the first and second standoffs defining direct electrical paths between the first and second sensor probes and the first and second pads, respectively.

18. The plug of claim 15, wherein the integrated circuit component comprises a memory chip having a memory circuit including data that uniquely identifies the plug, the memory circuit being configured to transmit data when the first and second sensor probes are connected to corresponding connectivity sensors associated with a receptacle that receives the plug, the memory circuit being configured to transmit data based on an interrogation signal transmitted to at least one of the first and second sensor probes.

19. The plug of claim 15, further comprising mounting features comprising first and second clips, the mounting features directly connect the first and second sensor probes to the first and second pads, respectively, wherein the first sensor probe is held by the first clip in an interference fit, and the second sensor probe is held by the second clip in an interference fit, the first clip being electrically and mechanically coupled to the first pad, the second clip being electrically and mechanically coupled to the second pad.

20. The plug of claim 15, further comprising an overmolded strain relief boot surrounding a portion of the body, at least a portion of the substrate and portions of the first and second sensor probes, the first and second sensor probes having portions extending from the strain relief boot at the mating end of the body.

21. The plug of claim 15, wherein the body is configured to be received in a receptacle of a receptacle housing through a front connectivity interface thereof, the receptacle housing having a plurality of connectivity sensors external of the receptacle exposed along the front connectivity interface, and wherein the first and second sensor probes have probe tips being configured to engage the connectivity sensors at the front connectivity interface when the body of the plug is loaded into the receptacle.

* * * * *

UNITED STATES PATENT AND TRADEMARK OFFICE
CERTIFICATE OF CORRECTION

| | | |
|---|---|---|
| PATENT NO. | : 8,142,221 B2 | Page 1 of 1 |
| APPLICATION NO. | : 12/762885 | |
| DATED | : March 27, 2012 | |
| INVENTOR(S) | : Charles Randall Malstrom et al. | |

It is certified that error appears in the above-identified patent and that said Letters Patent is hereby corrected as shown below:

Title Page, INID Code (12) change "Malstron et al." to "Malstrom et al."

Title Page, INID Code (75) Inventors, line 1, change "Charles Randall Malstron" to "Charles Randall Malstrom"

Signed and Sealed this
Fourteenth Day of August, 2012

David J. Kappos
*Director of the United States Patent and Trademark Office*